Figure 5:
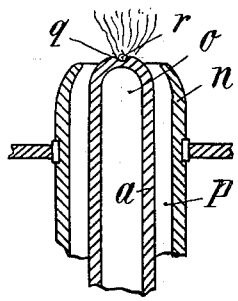

W. KOCHMANN.
APPARATUS FOR CARRYING OUT GAS REACTIONS, PARTICULARLY FOR THE PRODUCTION
OF OXID OF NITROGEN IN THE ELECTRIC ARC.
APPLICATION FILED JULY 18, 1910.
1,055,331.
Patented Mar. 11, 1913.
2 SHEETS—SHEET 1.
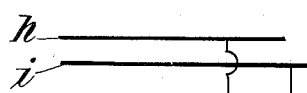
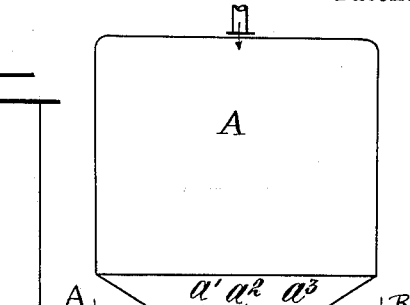
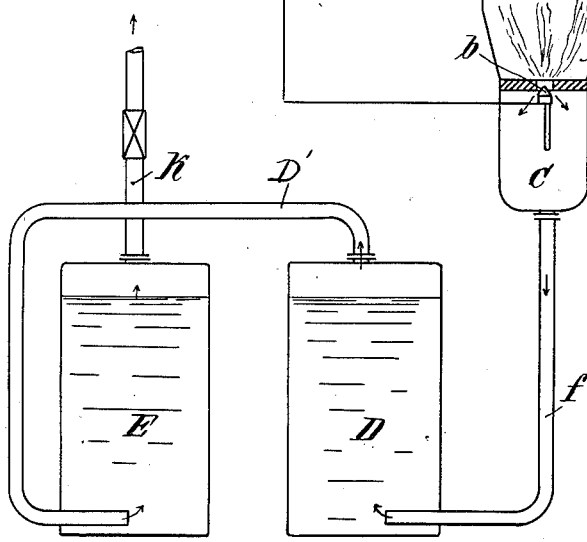
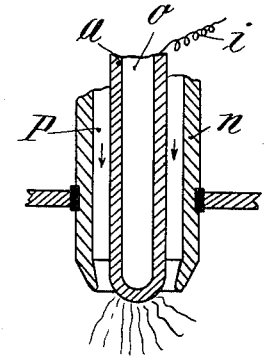
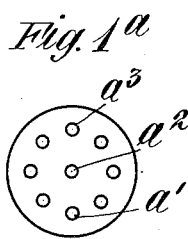
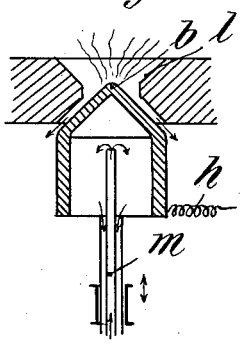
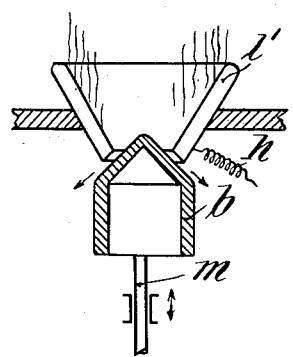
Witnesses:—
Inventor:—
W. Kochmann
by D. B. Willson
Attorney

UNITED STATES PATENT OFFICE.

WILHELM KOCHMANN, OF BERLIN, GERMANY.

APPARATUS FOR CARRYING OUT GAS REACTIONS, PARTICULARLY FOR THE PRODUCTION OF OXID OF NITROGEN IN THE ELECTRIC ARC.

1,055,331.

Specification of Letters Patent. Patented Mar. 11, 1913.

Application filed July 18, 1910. Serial No. 572,644.

*To all whom it may concern:*

Be it known that I, WILHELM KOCHMANN, a citizen of Germany, and a subject of the King of Prussia and Emperor of Germany, residing at Berlin, in the Kingdom of Prussia and Empire of Germany, have invented new and useful Improvements in Apparatus for Carrying out Gas Reactions, Particularly for the Production of Oxid of Nitrogen in the Electric Arc, of which the following is a specification.

It is known that nitrogen and oxygen, for instance atmospheric air, will combine to form oxid of nitrogen at very high temperatures. The ratio of the mixture between nitrogen and oxygen on the one hand and the nitrogen oxid produced on the other thereby depends on the degree of the temperature employed. With an increase of temperature the rapidity of the generation of the nitrogen oxid also increases much greater than the rapidity of the simultaneous process, in which latter process the nitrogen oxid produced is again disintegrated. Within the range of temperature from 1500° to 2300° C. the rapidity of disintegration is much greater than the rapidity of the generation; from 2300° upward the rapidity of generation increases much faster with the increasing temperature than does the disintegration. Below a temperature of 1500° both processes proceed so slowly, that they are of no importance for practical purposes. The oxidation of the nitrogen must therefore be effected at as high a temperature as possible, and on the other hand the products of reaction must be cooled down below a temperature of 1500° C. as quickly as possible, so that within this short period of time no essential disintegration can occur. Hitherto it was necessary owing to the necessity of such rapid cooling, to spread the electric energy of the arc by means of high voltages or magnetic fields over wide areas. This resulted in a great waste of electric energy, as much air was heated to a temperature, which was not sufficient for the generation of oxid of nitrogen. Such an insufficient heating was, however, found not only to be unnecessary but also directly detrimental, as it favored the disintegration of the already produced oxid of nitrogen. It was generally impracticable to employ short arcs at strong currents, which were thermically advantageous, as with such arcs around the hot core of said arc a zone is formed of a cooler temperature, in which the NO formed in the hot interior of the arc is again disintegrated. Thus a yield of nitrogen is obtained which does not correspond with the temperature of the interior of the arc but only with that of the cooler outside temperature.

This new apparatus renders it possible to work with either a continuous current or with an alternating current preferably with a continuous current. The electric energy is thereby further concentrated to a comparatively smaller space under increase of its effect. At the same time the dangerous cooler outer zone of the arcs is entirely avoided or considerably reduced. Furthermore with the present apparatus only such part of the reaction mixture can be cooled, which has been forced to pass immediately before cooling through the hottest part of the whole arc system. Thus an unnecessary heating to an insufficiently high temperature is avoided. Lastly the drop of temperature before and after the reaction may be made extraordinarily rapid, by reducing to an almost infinitesimal value the distance between the hottest point of the arc system and the point of cooling.

Figure 6:
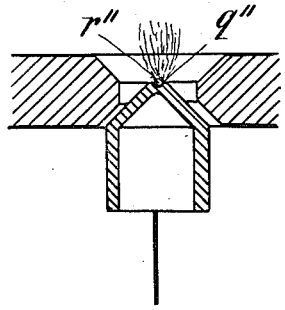
Figure 7:
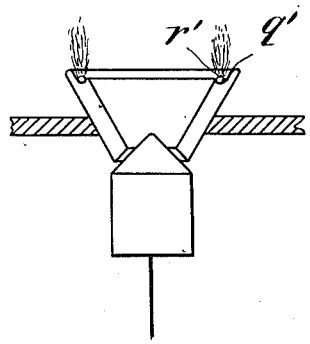

In the accompanying drawings: Figure 1 is a diagrammatical view of this improved apparatus in section; Fig. 1$^a$ is a section taken on the line A—B of Fig. 1; Fig. 2 is a single electrode on an enlarged scale. Figs. 3 and 4 are electrodes in the form of expansion nozzles on an enlarged scale; Fig. 5 shows details of an improvement in the electrodes. Figs. 6 and 7 represent improved forms of nozzles.

In Fig. 1, $h$ and $i$ are the feeder wires for the electric current, and A is a chamber in which the mixture of nitrogen and oxygen to be consumed is stored. B is the furnace proper. $a'$, $a^2$, $a^3$ are electrodes and air conduits; $b$ is a regulable nozzle serving as another electrode. C is the expansion chamber, $f$ is a pipe connecting the expansion chamber C and absorption apparatus D and forms a conduit for the passage of the expanded reaction gases from the chamber C to the absorption tanks D and E, which tanks are connected by a pipe D'. $h'$ is an outlet pipe for the reaction apparatus.

One of the electrodes $a'$, $a^2$, $a^3$ is shown in Fig. 2 and O is a recess therein for receiving the cooling water. *n* is a jacket, which surrounds the electrode *a*, *p* is a chamber through which the gases are conducted into the furnace B.

In Fig. 3 an electrode in form of a regulable nozzle *b* is shown. *l* is the wall of the nozzle, *b* is the movable plug, *m* is the supply pipe for the cooling water for *b*.

The electrode illustrated in Fig. 4 shows the same nozzle arrangement as Fig. 3, only the feeder wire *h* is connected to the wall of the nozzle *l'*, while in the form shown in Fig. 3 it is connected to plug *b*.

The electrode shown in Fig. 5 has a small recess or groove *q* therein which is filled with metal oxid.

The form shown in Figs. 6 and 7 includes the same nozzle arrangement as that shown in Figs. 3 and 4, $q''$ and $q'$ representing a recess and $r''$ and $r'$ a metal oxid.

The hereinbefore described effects of this apparatus may be obtained by opposing to a plurality of electrodes of the same polarity a single electrode of the opposite polarity (Fig. 1, $a'$, $a^2$, $a^3$, *b*). The arcs will then form close to the point where they meet a closed cone or funnel, which shows the dangerous cooler outer zone either not at all or but very much reduced in consequence of several of the arcs partly overlapping. At the same time at this one electrode a far greater density of current and consequently a far higher temperature is obtained than with an ordinary arc. As a part of the gases is strongly ionized by the heat of the not yet joining parts of the arcs so it will, when continuous current is used, also be subject to the chemical effect of the current in a manner analogous to that by which in an electrolyte, in a well known manner, oxidization or reduction effects are obtained by increasing the density of the current. For the production of oxid of nitrogen it is advisable to make the single electrode the positive pole.

If the single electrode is made in the form of a nozzle particularly in form of a regulable nozzle, as shown in Figs. 3 and 4, the arc system or cone is able to completely close the opening through which the reaction gases may escape, so that no gas can pass into the nozzle and be there cooled, which has not previously passed through the hottest part of the arc system, to wit, the point where the arcs meet. It is avoided by such means, that gas is cooled which has not been previously heated to the highest temperature. It is obvious that the nozzle and the electrodes must be cooled by water. The nozzle consists of the nozzle wall proper (Figs. 3 and 4, *l* and *l'*) and of a likewise cooled plug *b*. This plug is adjustable by means of a rod gear *m* and moves axially to the nozzle. Either the nozzle wall or the plug *b* may be made to act as an electrode. The nozzle may be made polygonal or any desired shape in cross section. This nozzle electrode which consists of several parts permits the regulation of the free passage in the nozzle according to requirements and of compensating for a long time the unavoidable wear of the nozzle by an adjustment of *b*. With the new nozzle electrode it is possible to reduce the distance along which the hot reaction gases come in contact with the cold metallic surface before they are cooled by expansion to a minimum. Thereby the cooling is obtained immediately behind the point of the highest temperature which is very important for obtaining a good result. The plurality of equal poled electrodes may also be used for conducting the reaction gases by providing them as shown in Fig. 2 with a jacket and passing the gases through the thus formed hollow space. Further advantages may be obtained in the arrangement of the electrodes by providing them and the nozzle electrodes each with a small recess *q*, which is filled with a metal oxid. The arc will then first melt this oxid and then pass over from the same, which will be of some advantage.

As there exists in the production of nitrogen oxid simultaneously a process of generation and a process of disintegration, the yield will not be the actual amount of nitrogen oxid produced, but only so great as to correspond with the difference between the rapidity of generation and disintegration. The ratio between these processes may be favorably influenced by either making the nozzle and electrodes and all cooling surfaces of a material or covering them with a material, which will increase the rapidity of generation in a catalytic manner, for which purpose platinum may be used under certain conditions.

I claim:

1. An apparatus for the production of reactions particularly for the generation of oxids of nitrogen in the electric arc comprising a furnace, a plurality of electrodes of the same polarity, a single electrode of opposite polarity opposed to said electrodes, said single electrode having a prominent spot from which the arcs proceed thereby rendering the effective surface of said single electrode smaller than the sum of the effective surfaces of the plurality of electrodes of the same polarity, the plurality of arcs being caused thereby to touch one another forming a cone of arcs and to concentrate the energy in the direction to the effective surface of said single electrode.

2. An apparatus for the production of reactions particularly for the generation of oxids of nitrogen in the electric arc, comprising a furnace, a plurality of electrodes of the same polarity, a single electrode of opposite polarity opposed to said electrodes, said single electrode having a prominent spot from which the arcs proceed, thereby rendering the effective surface of said single electrode smaller than the sum of the effective surfaces of the plurality of electrodes of the same polarity, the plurality of arcs being caused thereby to touch one another forming a cone of arcs and to concentrate the energy in the direction to the effective surface of said single electrode, said single electrode having the form of a nozzle adapted to be covered by the cone of arcs.

3. An apparatus for the production of reactions particularly for the generation of oxids of nitrogen in the electric arc, consisting of a furnace, a plurality of electrodes of the same polarity arranged to form a cone of arcs, a single electrode of opposite polarity opposed to said electrodes, said single electrode made in form of a water cooled expansion nozzle adapted to be covered by the cone of arcs, a conical water cooled central plug axially adjustable in said nozzle and adapted to regulate the free passage therein, and to serve as an electrode.

4. An apparatus for the production of reactions particularly the generation of oxids of nitrogen in the electric arc, consisting of a furnace, a plurality of electrodes of the same polarity arranged to form a cone of arcs, a single electrode of opposite polarity opposed to said electrodes, said single electrode being in the form of an expansion nozzle adapted to be cooled by the cone of arcs, the plurality of electrodes and the nozzle being provided with a recess which is filled with a metal oxid.

5. An apparatus for the production of reactions particularly for the generation of oxids of nitrogen in the electric arc, consisting of a furnace, a plurality of electrodes of the same polarity, arranged to form a cone of arcs, a single electrode of opposite polarity opposed to said electrodes, the electrodes and all cooling surfaces including a catalyzer which is adapted to increase the rapidity of generation relatively to the rapidity of disintegration.

6. A process for concentrating the energy of electric arcs in a furnace provided with electrodes of opposite polarity arranged opposite to each other consisting in forming a plurality of arcs converging to one and the same spot of an electrode, thereby forming a cone of arcs and concentrating the energy of the single arcs near said spot of said electrode.

7. A process of concentrating the energy of electric arcs in a furnace provided with electrodes of opposite polarity arranged opposite to each other which consists in forming a plurality of arcs converging from electrodes of the same polarity to one and the same spot of the oppositely arranged electrode of opposite polarity, forming a cone of arcs, and concentrating the energy of the single arcs near the electrode of opposite polarity.

8. A process for concentrating the energy of electric arcs in a furnace provided with electrodes of opposite polarity arranged opposite to each other which consists in forming a plurality of arcs converging to one and the same spot of an electrode, forming a cone of arcs, concentrating the energy of the single arcs near said spot of said electrode, and passing a current of gas through said cone of arcs.

In testimony whereof I have hereunto set my hand in presence of two subscribing witnesses.

WILHELM KOCHMANN.

Witnesses:
HENRY HASPER,
WOLDEMAR HAUPT.